United States Patent [19]

Crothers

[11] 4,031,864

[45] June 28, 1977

[54] MULTIPLE FUEL SUPPLY SYSTEM FOR AN INTERNAL COMBUSTION ENGINE

[75] Inventor: William T. Crothers, Sunol, Calif.

[73] Assignee: The United States of America as represented by the United States Energy Research and Development Administration, Washington, D.C.

[22] Filed: Mar. 9, 1976

[21] Appl. No.: 665,191

[52] U.S. Cl. ............................. 123/1 A; 123/25 A; 123/127; 123/136; 60/39.05; 60/39.3; 60/39.53; 60/39.28 R

[51] Int. Cl.² ........................................ F02B 75/12

[58] Field of Search ............... 123/1 A, 25 A, 127, 123/136, 179 G, 180 AC; 60/39.05, 39.28 R, 39.3, 39.53

[56] References Cited

UNITED STATES PATENTS

| | | | |
|---|---|---|---|
| 3,220,393 | 11/1965 | Schlink | 123/136 X |
| 3,766,734 | 10/1973 | Jones | 60/39.28 R |
| 3,783,841 | 1/1974 | Hirschler | 123/1 A |

Primary Examiner—Clarence R. Gordon
Attorney, Agent, or Firm—Dean E. Carlson; Roger S. Gaither; Irene S. Croft

[57] ABSTRACT

A multiple fuel supply or an internal combustion engine wherein phase separation of components is deliberately induced. The resulting separation permits the use of a single fuel tank to supply components of either or both phases to the engine. Specifically, phase separation of a gasoline/methanol blend is induced by the addition of a minor amount of water sufficient to guarantee separation into an upper gasoline phase and a lower methanol/water phase. A single fuel tank holds the two-phase liquid with separate fuel pickups and separate level indicators for each phase. Either gasoline or methanol, or both, can be supplied to the engine as required by predetermined parameters. A fuel supply system for a phase-separated multiple fuel supply contained in a single fuel tank is described.

14 Claims, 3 Drawing Figures

MULTIPLE FUEL SUPPLY SYSTEM FOR AN INTERNAL COMBUSTION ENGINE

The invention described herein was made in the course of, or under, United States Energy Research and Development Administration Contract No. W-7405-ENG-48 with University of California.

BACKGROUND OF THE INVENTION:

This invention relates to a method and system for supplying fuel to an automotive engine. More particularly, this invention relates to a method and system for supplying fuel to an internal combustion engine from a multiple fuel supply contained in a single fuel tank.

Transportation is unique among the energy-consuming sectors of the economy in that it is totally dependent on one source of fuel: crude oil. Because of the shortage of domestic petroleum, coal and oil shale are being considered as sources of petroleum substitutes. There are a number of possible process routes from shale or coal to liquid fuels suitable for the transportation market that may be economically competitive with gasoline from crude oil. Of these, however, only methanol-from-coal is based on existing technology.

Methanol has been used in motor vehicles either pure or blended with gasoline. Sufficient data exists to support the feasibility of using methanol in automobiles, and in fact limited emissions data suggest that methanol may provide a very effective means of achieving strict emissions goals as well as improved engine efficiency.

A number of problems arise when considering modification of the complex infrastructure associated with United States transportation to include methanol. Commonly listed are phase separation in methanol blends, difficulty with cold starts with straight methanol, limited initial availability of a new fuel, materials compatibility, and vapor lock and driveability associated with blends when used in current autos. Gasoline and methanol blends are subject to phase separation in the presence of small quantitities of water, as shown in the equilibrium phase diagram, FIG. 1. With conventional fuel supply systems, such separation causes engine malfunction. Various special precautions have been proposed to prevent such separation. For example, it has been proposed to add a small amount of ethylether, acetone, butanol, or cyclohexanol to prevent to some extent the separation of methanol, but these additives are too costly to be used in gasoline. It has also been proposed to use two separate fuel tanks, one for each fuel.

To facilitate introduction of methanol into the automative market, particularly when widespread availability may not be guaranteed, cars must also be able to run on either gasoline (including synthetic gasoline) or methanol (or blend of alcohol fuels). Thus, the need exists for a practical approach which solves the problems associated with the introduction of methanol fuel, particularly the difficult problem associated with water-induced phase separation.

SUMMARY OF THE INVENTION

In accordance with the present invention, phase separation of a phase-separable multiple fuel supply is deliberately induced. The resulting separation permits the use of a single fuel tank to supply liquid from either phase to the engine. The quantity of liquid withdrawn from each phase can readily be controlled in accordance with predetermined parameters.

Specifically, a minor amount of water, more than about 0.5%, sufficient to guarantee phase separation is added to a blend of a liquid hydrocarbon fuel, particularly gasoline, and an alcohol fuel, preferably methanol. The term gasoline is used herein to include synthetic gasoline and the term alcohol is used herein to include mixtures of alochols. The liquid system separates into two immiscible phases, an upper phase comprising the liquid hydrocarbon fuel and a lower phase comprising alcohol and water.

The present invention also provides for a fuel supply system comprising a single fuel tank for containing the phase-separated multiple fuel supply and means for supplying the engine with liquid from either or both phases. The present fuel supply system is particularly useful with a computer-controlled electronic fuel-injection-and-management fuel systems.

Thus, it is an object of this invention to provide a method and means for supplying a combustion engine with fuel from a phase-separable multiple fuel supply contained in a single fuel tank.

More particularly, it is an object of this invention to provide a method and means for supplying an internal combustion engine with fuel from a gasoline and alcohol fuel blend contained in a single fuel tank.

Other objects and advantages will become apparent from the following detailed description made with reference to the accompanying drawings.

DETAILED DESCRIPTION OF THE INVENTION:

According to the present invention, phase separation of a phase-separable multiple fuel supply is deliberately induced to produce an upper phase containing a substantial proportion of a first component and a lower phase containing a substantial proportion of a second component. The two-phase mixture is contained in a single container provided with means for withdrawing liquid separately from each phase. Thus, the engine can be supplied with liquid from either phase, or liquid can be withdrawn separately from each phase and supplied in varying proportions to the combustion engine. The quantity of liquid supplied from either phase is preferably controlled by electronic means in accordance with at least one predetermined engine parameter.

The present invention is particularly applicable to the use of a fuel mixture comprising a liquid hydrocarbon fuel such as gasoline and an alcohol fuel which separates into two distinct layers in the presence of a minor but sufficient amount of water.

Figure 1:
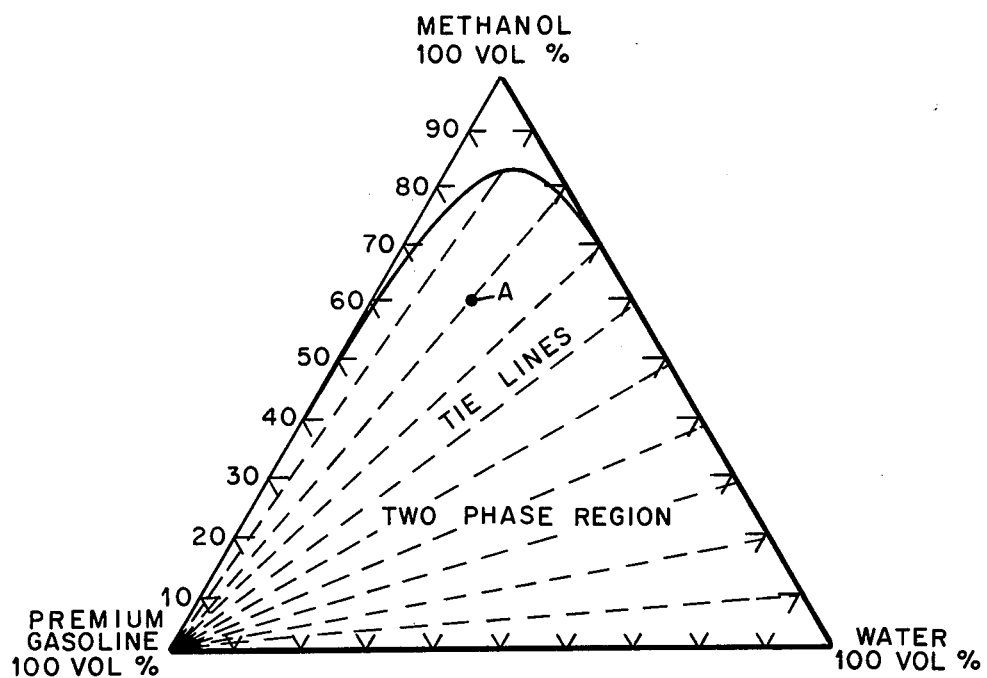
FIG. 1 is an equilibrium phase diagram for a water-methanol-gasoline system.

In a preferred method of operation, a minor amount, at least about 0.5%, of water is added to a blend of gasoline and methanol to induce separation into an upper phase comprising gasoline and a lower phase comprising methanol and water. The lower limit on the amount of water to be used is the least amount necessary to induce phase separation. This amount is readily determinable for a specific gasoline by reference to an equilibrium phase diagram such as FIG. 1. For example, referring to FIG. 1, the composition indicated by the solid dot labeled A will separate into a 100% gasoline phase at one end of the tie line and a 20% water-in-methanol phase at the other end of the tie line.

The upper limit on the amount of water to be used is determined by the ability of the engine to run properly, and can be optimized for best efficiency or lowest emissions.

The addition of water can play an important role in emissions generation because the cooling effect of the water lowers combustion temperatures reducing nitrogen oxide production which is temperature-time dependent. The same cooling effect also reduces heat transfer to the combustion chamber walls which, within a range, can increase efficiency.

Figure 2:
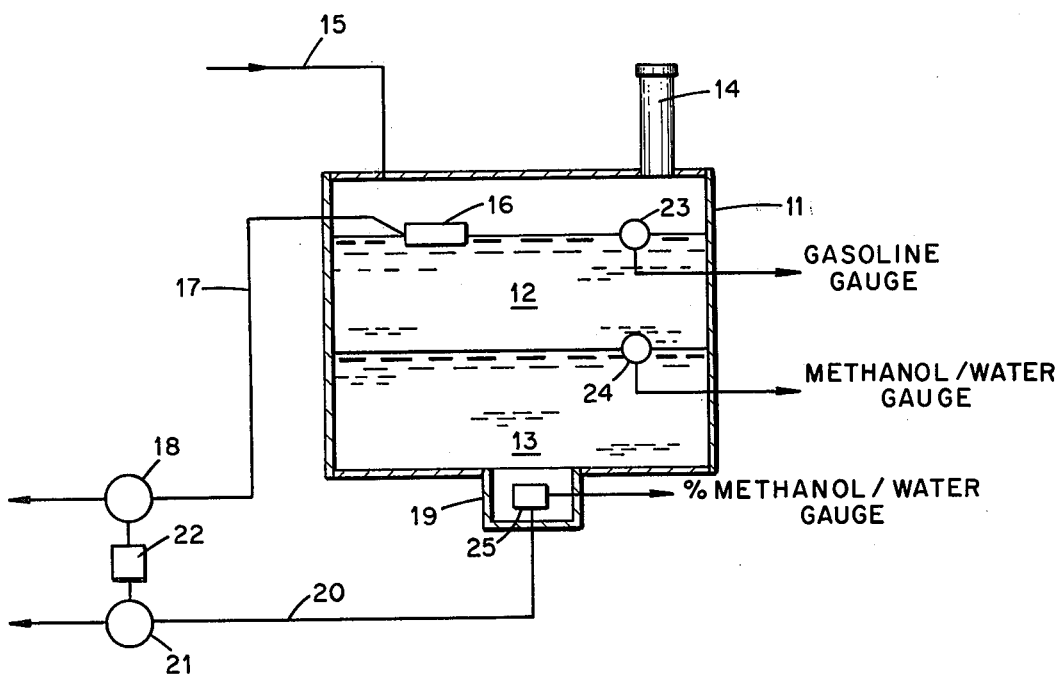
FIG. 2 is a schematic representation of a preferred embodiment of a fuel supply system in accordance with the present invention.

A preferred embodiment of the present fuel supply system is shown schematically in FIG. 2. Referring to FIG. 2, numeral 11 refers to a fuel tank for containing a gasoline-methanol fuel blend to which sufficient water has been added to induce phase separation into an upper layer 12 consisting predominately of gasoline and a lower layer 13 consisting predominately of methanol and water. The tank is provided with inlet 14 for introduction of fuel and with an inlet for the return line 15 from the engine. A pickup device 16 floats on the gasoline phase and supplies the engine with gasoline via outlet line 17 and fuel pump 18. the lower phase of methanol and water is supplied to the engine via sump outlet 19, outlet line 20, and fuel pump 21. A suitable control device 22 controls the quantity of liquid supplied from each phase in accordance with predetermined parameters. The control device may be manually or mechanically actuated, or it may be responsive to an electrical or electronic signal. The amounts of gasoline and methanol/water in the tank are indicated by the positions of graded-density floats 23 and 24, respectively, which are input to conventional fuel gauge circuits, not shown. The composition of the methanol/water mixture is monitored by a suitable density or other suitable measuring device 25, such as a chain-balance density meter, which is input to a conventional gauge circuit, not shown. The density of the gasoline phase is about 0.68 g/cc and the density of the methanol/water phase is 0.79 g/cc or greater. Thus, the density of float 23 will be less than about 0.68 g/cc and the density of float 24 will be between about 0.68 and about 0.79 g/cc. The tank is preferably provided with suitable means for stabilizing the separated layers during road movement. For example, the tank can be filled with open-cell foam or bulkheads to prevent mixing during movement.

The present fuel supply system can be used with either a fuel injection system or a carburetion system, preferably computer-controlled. In a specific embodiment of the invention, the present fuel supply system is used in combination with a computer-controlled electronic fuel-injection-and-ignition management system. With some modifications, the present internal combustion engine can be equipped with electronic controls. Engine modifications would include substitution of electronic fuel injection for the carburetion system commonly used. In electronic fuel injection systems, the fuel is injected in the intake manifold directed at the back side of the intake valve. With a fuel injection system, no modification of carburetor heat is required to compensate for the increased heat of vaporization of methanol fuels. In operation, the pulse width driving each injector is varied depending upon the amount of fuel required as well as on the fuel type, whether it be gasoline, synthetic gasoline, methanol, or methanol and water. Thus, any fuel or combination of fuel that has suitable combustion characteristics for the engine can be utilized, and each cylinder can be individually optimized for lowest emissions. Computer-controlled electronic ignition is desirable to obtain optimum performance.

A closed-loop operation is preferred. In order to achieve closed-loop operation it is necessary to monitor the composition of the exhaust or some other performance parameter. Exhaust is a function of engine operating parameters and air-to-fuel ratio. An oxygen sensor utilizing a solid electrolyte, such as zirconium or titanium dioxide, that selectively passes oxygen ions from an oxygen-rich surface to an oxygen-deficient one, thus generating a voltage between the surfaces, can provide the necessary feedback for controlling the air/fuel mixture.

Computer control of an automotive engine is accomplished by sensing what the driver wants to do as well as determining the engine operating conditions and fuel type. Using this data, the control system furnished the correct amount of the correct fuel and sets the spark timing to optimize the use of fuel and minimize emissions.

Figure 3:
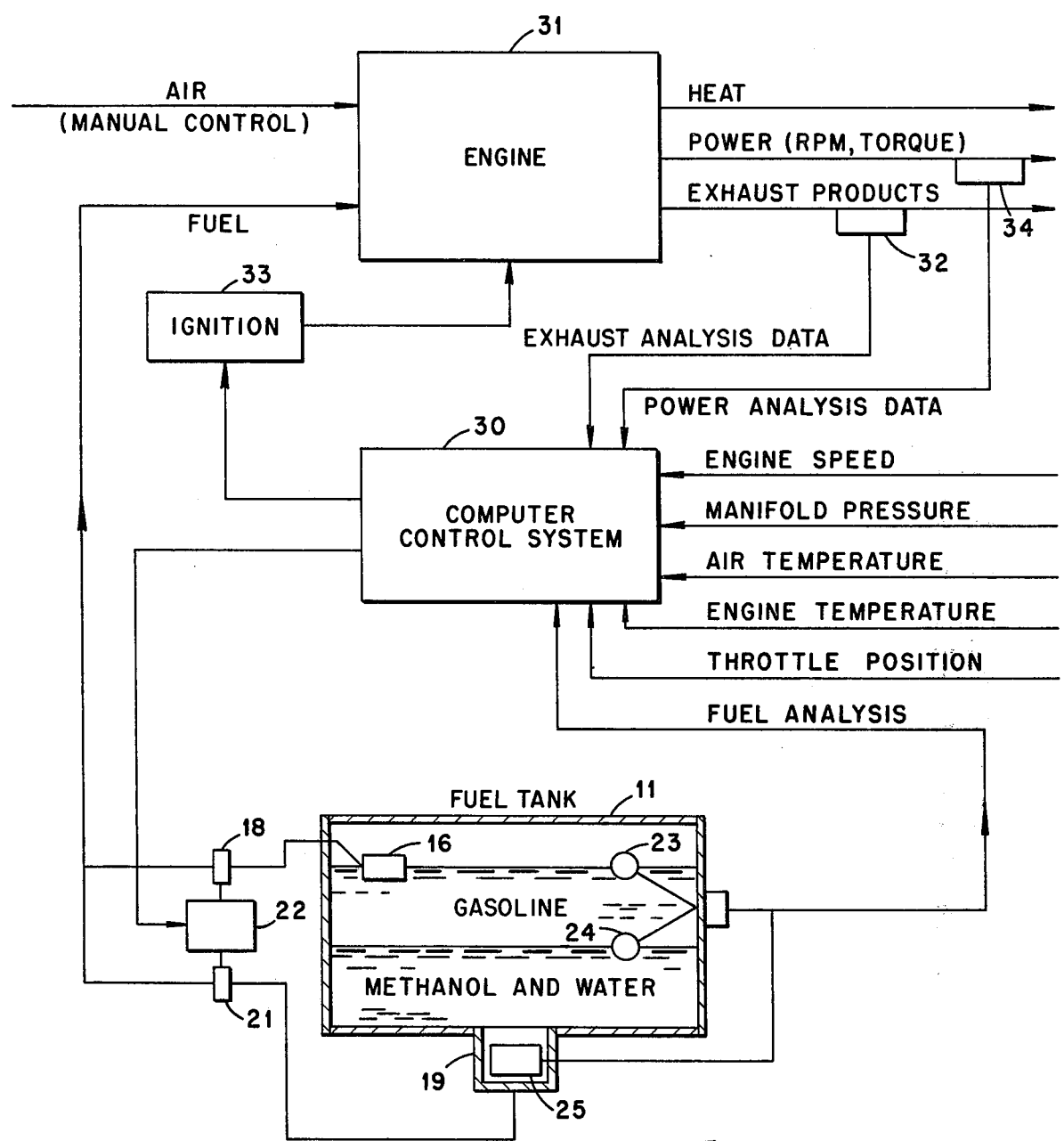
FIG. 3 is a schematic representation of a closed-loop computer-controlled electronic fuel-injection-and-ignition management system incorporating the fuel supply system shown in FIG. 2.

The use of the present fuel supply system with a closed-loop computer-controlled electronic fuel-injection-and-ignition-management system is shown schematically in FIG. 3. Referring to FIG. 3, the numeral 30 represents a computer control system operatively coupling engine 31 with fuel tank 11. Level indicators 23 and 24 and fuel compositon measuring device 25 provide fuel analysis input to computer 30. Various other parameters, such as engine speed, manifold pressure, air temperature, engine temperature, and throttle position are also fed into the computer control system. Control device 22 is responsive to a command signal from computer 30 and controls the quantity of liquid withdrawn from each phase so that the correct fuel proportions of fuel are supplied to the engine in accordance with at least one predetermined parameter. Sensor 32 monitors the exhaust products and provides exhaust analysis data and/or sensor 34 provides performance data to computer 30 for feedback control. Numeral 33 represents an electronic ignition system which also can be controlled by computer 30. Spark timing can be varied to optimize the use of fuel and minimize emissions.

With the fuel supply system of the present invention, an engine can be started on gasoline and switched automatically to the methanol-water mixture when warmed up, thus avoiding the cold-start problems of methanol or water/methanol mixtures. Consequently a small amount of starting gasoline is all that is absolutely necessary for today's engines.

Another advantage of the present fuel supply system is that an automobile can run on any available fuel, gasoline, gasoline-methanol blends, straight methanol or methanol and water, depending on climatic conditions, fuel availability, and emissions requirements. Thus, the present system simplifies the distribution system that would be required for the new fuel. It admits regional introduction but retains the ability of cars to travel freely.

Still another advantage of the present system is that it admits the possibility of water-injection into gasoline or synthetic gasoline with no methanol present at all to lower $NO_x$ emissions and raise efficiencies. In this mode of operation, water is simply added to the tank where it separates to the bottom. The computer then causes water to be injected from the separated water phase by a special injector in the air manifold when the engine has warmed up.

In the gasoline/methanol-water two-phase fuel system, a small fraction (2–3%) of the gasoline is soluble in the methanol-water phase and a small amount ($\sim$ 350 ppm) of water and possibly methanol goes into the gasoline phase. These temperature-dependent effects may cause slight changes in the octane and vapor pressure properties of both fuels. These will not cause problems since water contamination of gasoline, addition of methanol to gasoline to absorb water contamination, and small variations in octane rating are all common occurrences in automotive practice.

A suitable corrosion inhibitor may be added to the fuel system to inhibit the corrosive effects of added water. Alternatively, suitable corrosion-resistant materials may be selected for fabrication of the system.

Although the invention has been hereinbefore described and illustrated in the accompanying drawings with respect to a preferred embodiment, it will be appreciated that various modifications and changes may be made therein without departing from the true spirit and scope of the invention, and thus it is not intended to limit the invention except by the terms of the following claims.

What I claim is:

1. A method for supplying a combustion engine with fuel from a multiple liquid fuel supply contained in a single container, said multiple liquid fuel being phase-separable to form a two-phase liquid, the upper phase containing a major proportion of a first component of the multiple fuel and the lower phase containing a major proportion of a second component of the multiple fuel, which comprises:
    inducing phase separation of the multiple liquid fuel, thereby establishing the two-phase liquid in the container;
    supplying the combustion engine with liquid selected from the group consisting of liquid withdrawn from the upper phase, liquid withdrawn from the lower phase, and liquid withdrawn from both the upper phase and the lower phase.

2. A method according to claim 1 wherein the multiple liquid fuel is a mixture of a liquid hydrocarbon fuel and an alcohol fuel, said mixture being phase-separable in the presence of a minor amount of water, and phase separation is induced by addition of an amount of water sufficient to form an upper phase containing a major proportion of the liquid hydrocarbon fuel and a lower phase containing a major proportion of the alcohol fuel and water.

3. A method according to claim 2 wherein the liquid hydrocarbon fuel is gasoline.

4. A method according to claim 3 wherein the alcohol fuel is methanol.

5. A fuel supply system for supplying a combustion engine with fuel from a multiple liquid fuel supply which is phase-separable to form a two-phase liquid, the upper phase containing a major proportion of a first component of the multiple fuel and the lower phase containing a major proporton of a second component of the multiple fuel, which comprises a tank for containing a two-phase liquid, said tank being provided with inlet means admitting the introduction of multiple liquid fuel components and a phase separation inducing agent, first supply means communicating with an upper phase liquid for supplying a combustion engine therewith, and second supply means communicating with a lower phase liquid for supplying a combustion engine therewith.

6. A fuel supply system according to claim 5 further including control means operatively associated with said first supply means and said second supply means for controlling the quantity of liquid supplied from each phase in accordance with at least one predetermined parameter.

7. A fuel supply system according to claim 6 wherein the control means are responsive to a command signal provided by computing means.

8. A fuel supply system according to claim 6 wherein said tank is further provided with stabilizing means within said tank for stabilizing the separated phases.

9. A fuel supply system according to claim 6 wherein said tank is further provided with a first level monitoring means operatively associated with the level of the upper phase for determining the level of the upper phase liquid in the tank and a second level monitoring means operatively associated with the level of the lower phase for determining the level of the lower phase liquid in the tank.

10. A fuel supply system according to claim 6 wherein the multiple liquid fuel is a mixture of a liquid hydrocarbon fuel and an alcohol fuel which is phase-separable by the addition of an amount of water sufficient to form an upper phase containing a major proportion of the liquid hydrocarbon fuel and a lower phase containing a major proportion of the alcohol fuel and water.

11. A fuel supply system according to claim 10 wherein the liquid hydrocarbon fuel is gasoline.

12. A fuel supply system according to claim 11 wherein the alcohol fuel is methanol.

13. In combination with a fuel delivery and metering system having computing means for providing a fuel delivery and metering command signal to control the actuation of valve means whereby the delivery and metering of fuel to an engine combustion chamber is controlled, a fuel supply system for supplying the internal combustion engine with fuel from a multiple liquid fuel supply which is phase-separable to form a two-phase liquid, the upper phase containing a major proportion of a first component of the multiple fuel and the lower phase containing a major proportion of a second component of the multiple fuel, said fuel supply system comprising a tank for containing a two-phase liquid, said tank being provided with inlet means admitting the introduction of multiple liquid fuel components and a phase separation inducing agent, first supply means communicating with an upper phase liquid for supplying an internal combustion engine therewith, and second supply means communicating with a lower phase liquid for supplying an internal combustion engine therewith; and control means operatively associated with said first supply means and said second supply means and responsive to a command signal provided by said computing means to control the quantity of liquid supplied from each phase in accordance with at least one predetermined engine parameter.

14. The combination according to claim 13 wherein the fuel delivery and metering system is a fuel injection system, the fuel delivery and metering command signal is a fuel injection command signal and said valve means are injector valve means.

* * * * *